A. W. WENZEL.
PACKING RING.
APPLICATION FILED OCT. 30, 1912.

1,074,675.

Patented Oct. 7, 1913.

WITNESSES:
Howard R. King.
Mildred E. Brooks.

INVENTOR:
Albert W. Wenzel,
BY
Russell M. Everett,
ATTORNEY.

UNITED STATES PATENT OFFICE.

ALBERT W. WENZEL, OF NEWARK, NEW JERSEY, ASSIGNOR TO AMERICAN PISTON RING COMPANY, A CORPORATION OF NEW JERSEY.

PACKING-RING.

1,074,675.	Specification of Letters Patent.	Patented Oct. 7, 1913.

Application filed October 30, 1912. Serial No. 728,580.

*To all whom it may concern:*

Be it known that I, ALBERT W. WENZEL, a subject of Hungary, residing at Newark, in the county of Essex and State of New Jersey, have invented certain Improvements in Packing-Rings, of which the following is a specification.

The objects of this invention are to provide a packing ring which shall have a uniform tension for its entire periphery; to produce such a tension by hammering or distorting the material of which the ring is composed, and yet without weakening the ring or rendering it liable to breakage; to enable the ring to be readily and cheaply manufactured with great accuracy, and to obtain other advantages and results some of which may be hereinafter referred to.

Figure 1:
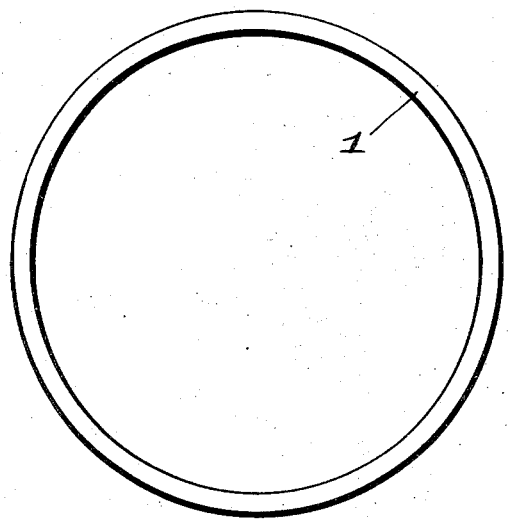
Figure 2:
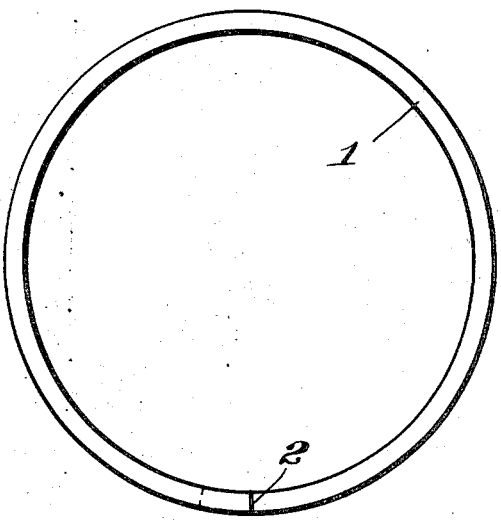
Figure 5:
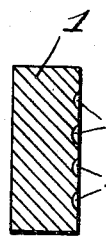
Figure 3:
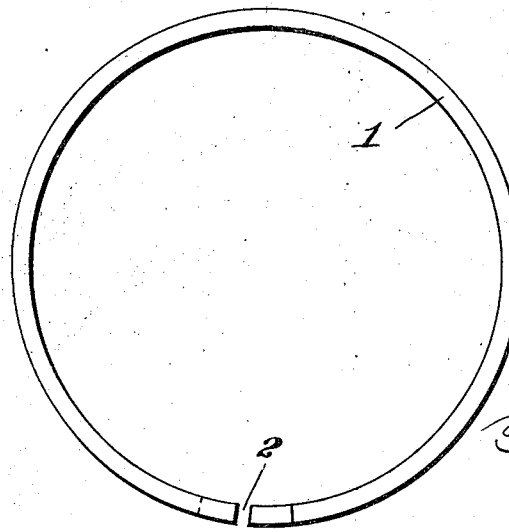
Figure 4:
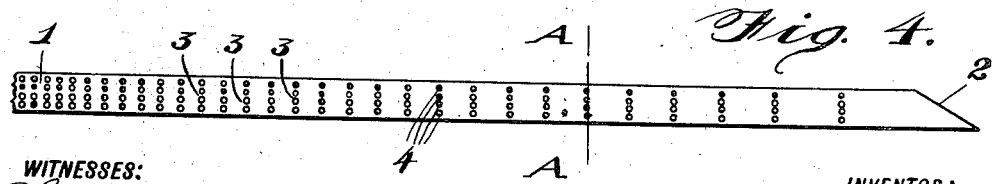

Referring to the accompanying drawings, in which like numerals of reference indicate the same parts throughout the several figures, Figure 1 is a view of a ring blank before cutting; Fig. 2 is a similar view of the blank after cutting; Fig. 3 is a view of the ring after hammering; Fig. 4 is a view on larger scale of one half of the ring from inside, and Fig. 5 is a further enlarged cross-section on line A—A of Fig. 4.

In said drawings, 1 indicates a plain circular ring of any suitable material, preferably metal, which is of substantially uniform cross-section at all points. This ring is cut, or parted, as at 2, in Fig. 2, in any suitable and well-known manner, and then the metal or other material of which the ring is composed is distorted so as to open the ring, as shown in Fig. 3, and still keeping it in circular shape give it such a uniform tension that if its size is changed, it will remain circular and the tendency to return to its normal size will be uniform at all points of the ring. This tension may be secured by distorting the ring upon its outer side, to cause it to contract, or by distorting the ring at its inner side to cause it to expand, and it is this latter construction which I have shown to illustrate the invention. The distortion referred to is effected by producing circumferentially of the ring a series of transverse series 3 of dents or indentations 4, each transverse series terminating short of the edges of the surface of the ring being treated, and the dents or indentations of each transverse series being spaced from one another, as shown. This spacing insures that the skin or surface of the metal is not broken for any considerable distance, and thus the ring is not liable to crack or break in manufacture or use. The dents or indentations 4 may be of any form or depth or distance from one another, but I prefer to make them with a pointed tool or punch, and place four of them across about a quarter-inch surface, as shown in full size on Fig. 4. More or less than four could be used, however.

The transverse series 3 of dents or indentations 4 preferably extend each across the ring at right angles, as shown, and in straight lines, but obviously they could be otherwise arranged, if desired, in any manner suggesting itself to one skilled in the art.

The dents or indentations 4 are preferably all of substantially the same depth, or formed by blows of substantially equal intensity, in each transverse series, but obviously they may be varied as desired to suit different conditions. Furthermore, the dents or indentations of the various transverse series 3 around the ring are preferably alike, as shown, and the desired uniformity of tension circumferentially around the ring obtained by variously spacing the transverse series, as shown; that is to say, at that portion of the ring opposite its cut 2, the transverse series 3 are close together and from that portion of the ring toward its ends they are placed farther and farther apart. Under some conditions, however, the transverse series 3 could be equally spaced and the dents or indentations 4 vary in depth or intensity of the blows forming them; that is to say, the dents or indentations would be deepest at that portion of the ring opposite its cut or split 2 and become less and less deep toward the ends of the ring. Or uniformity of tension might be obtained, either partially or wholly, by making the number of dents or indentations in the successive transverse series vary circumferentially of the ring; that is to say, at that portion of the ring opposite its cut or split 2, there would be a greatest number of dents or indentations in the transverse series, and there would be less and less dents in the transverse series as the ends of ring were approached.

Having thus described the invention, what I claim is—

1. A packing ring consisting of a split ring of uniform cross-section having in a curved surface a circumferential series of transverse series of dents or indentations.

2. A packing ring consisting of a split ring of uniform cross-section having in a curved surface a circumferential series of transverse series of dents or indentations, said transverse series being all substantially alike but differing in distance apart.

3. A packing ring consisting of a split ring of uniform cross-section having in a curved surface a circumferential series of transverse series of dents or indentations, said transverse series being closest together opposite the split of the ring and getting farther apart in either direction.

4. A packing ring consisting of a split ring of uniform cross-section having in a curved surface a circumferential series of transverse series of dents or indentations, the dents or indentations being all substantially alike but the transverse series differing in distance apart.

5. A packing ring consisting of a split ring of uniform cross-section having in a curved surface a circumferential series of transverse series of dents or indentations, the dents or indentations of each transverse series being separated by unbroken portions of the said surface.

6. A packing ring consisting of a split ring of uniform cross-section having in a curved surface a circumferential series of transverse series of dents or indentations, the dents or indentations of each transverse series being separated by unbroken portions of said surface and the ends of the series being separated from the edge of the ring by unbroken portions of its surface.

7. A packing ring consisting of a split ring of uniform cross-section having in a curved surface a circumferential series of transverse series of dents or indentations, the ends of said transverse series being separated from the edge of the ring by unbroken portions of the said surface.

ALBERT W. WENZEL.

Witnesses:
  HOWARD P. KING,
  JANET A. AYERS.